(12) United States Patent
Sakurada et al.

(10) Patent No.: US 11,625,767 B2
(45) Date of Patent: Apr. 11, 2023

(54) INFORMATION PROCESSING APPARATUS, INFORMATION PROCESSING METHOD AND NON-TRANSITORY RECORDING MEDIUM

(71) Applicant: TOYOTA JIDOSHA KABUSHIKI KAISHA, Toyota (JP)

(72) Inventors: Shin Sakurada, Toyota (JP); Kazuya Nishimura, Toyota (JP); Masaru Ando, Seto (JP); Toshinari Honda, Anjo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 85 days.

(21) Appl. No.: 17/231,254

(22) Filed: Apr. 15, 2021

(65) Prior Publication Data

US 2021/0326973 A1    Oct. 21, 2021

(30) Foreign Application Priority Data

Apr. 17, 2020 (JP) .............................. JP2020-074051

(51) Int. Cl.
*G06Q 30/00* (2023.01)
*G06Q 30/0645* (2023.01)
*G06Q 50/30* (2012.01)
*G06Q 30/0208* (2023.01)

(52) U.S. Cl.
CPC ..... *G06Q 30/0645* (2013.01); *G06Q 30/0208* (2013.01); *G06Q 50/30* (2013.01)

(58) Field of Classification Search
CPC ............. G06Q 30/0207–0239; G06Q 30/0645
See application file for complete search history.

(56) References Cited

U.S. PATENT DOCUMENTS

| | | | | |
|---|---|---|---|---|
| 10,445,758 | B1* | 10/2019 | Bryer | G06Q 40/08 |
| 2002/0107665 | A1* | 8/2002 | Tyson | A47L 15/0049 |
| | | | | 702/183 |
| 2002/0165695 | A1* | 11/2002 | Tyson | A47L 15/0049 |
| | | | | 702/182 |
| 2011/0011422 | A1* | 1/2011 | Jeon | F24C 14/02 |
| | | | | 134/57 R |
| 2015/0081404 | A1* | 3/2015 | Basir | G06Q 30/08 |
| | | | | 705/14.1 |
| 2018/0330475 | A1* | 11/2018 | Tokatyan | G06F 18/24 |
| 2019/0061619 | A1* | 2/2019 | Reymann | B60Q 9/00 |
| 2019/0066249 | A1* | 2/2019 | Decaluwe | G06Q 30/0282 |

(Continued)

FOREIGN PATENT DOCUMENTS

JP      2009271632 A   11/2009
JP      2019020859 A   2/2019

(Continued)

*Primary Examiner* — Luis A Brown
(74) *Attorney, Agent, or Firm* — Sughrue Mion, PLLC

(57) ABSTRACT

The present disclosure provides a technique to encourage a user who is lent a vehicle to obey manners at time of using the vehicle. In the present disclosure, a controller executes: informing a user who is lent a vehicle of information indicating a plurality of manners provisions about use of the vehicle; acquiring a picked-up image of the vehicle about the plurality of manners provisions at time of returning the vehicle; and calculating an evaluation value for obedience of the plurality of manners provisions, based on the picked-up image.

16 Claims, 12 Drawing Sheets

(56) References Cited

U.S. PATENT DOCUMENTS

| | | | |
|---|---|---|---|
| 2019/0187716 A1* | 6/2019 | Cantrell | G05D 1/0225 |
| 2019/0197325 A1* | 6/2019 | Reiley | G08B 13/19602 |
| 2020/0097743 A1* | 3/2020 | Shiga | G06V 20/41 |
| 2020/0104778 A1* | 4/2020 | Tiderington | G06Q 30/0645 |
| 2020/0152067 A1* | 5/2020 | Salles | G08G 1/20 |
| 2020/0175783 A1* | 6/2020 | Adams | G06T 7/001 |
| 2020/0238953 A1* | 7/2020 | Spasovski | G01C 21/3407 |
| 2021/0003413 A1* | 1/2021 | Woo | G01C 21/3605 |
| 2021/0125322 A1* | 4/2021 | Ventimiglia | G07C 5/0825 |
| 2021/0272188 A1* | 9/2021 | Kobayashi | G06Q 30/0645 |

FOREIGN PATENT DOCUMENTS

| | | |
|---|---|---|
| JP | 2019-061575 A | 4/2019 |
| JP | 2019159768 A | 9/2019 |
| JP | 2020035223 A | 3/2020 |
| JP | 2020052471 A | 4/2020 |

\* cited by examiner

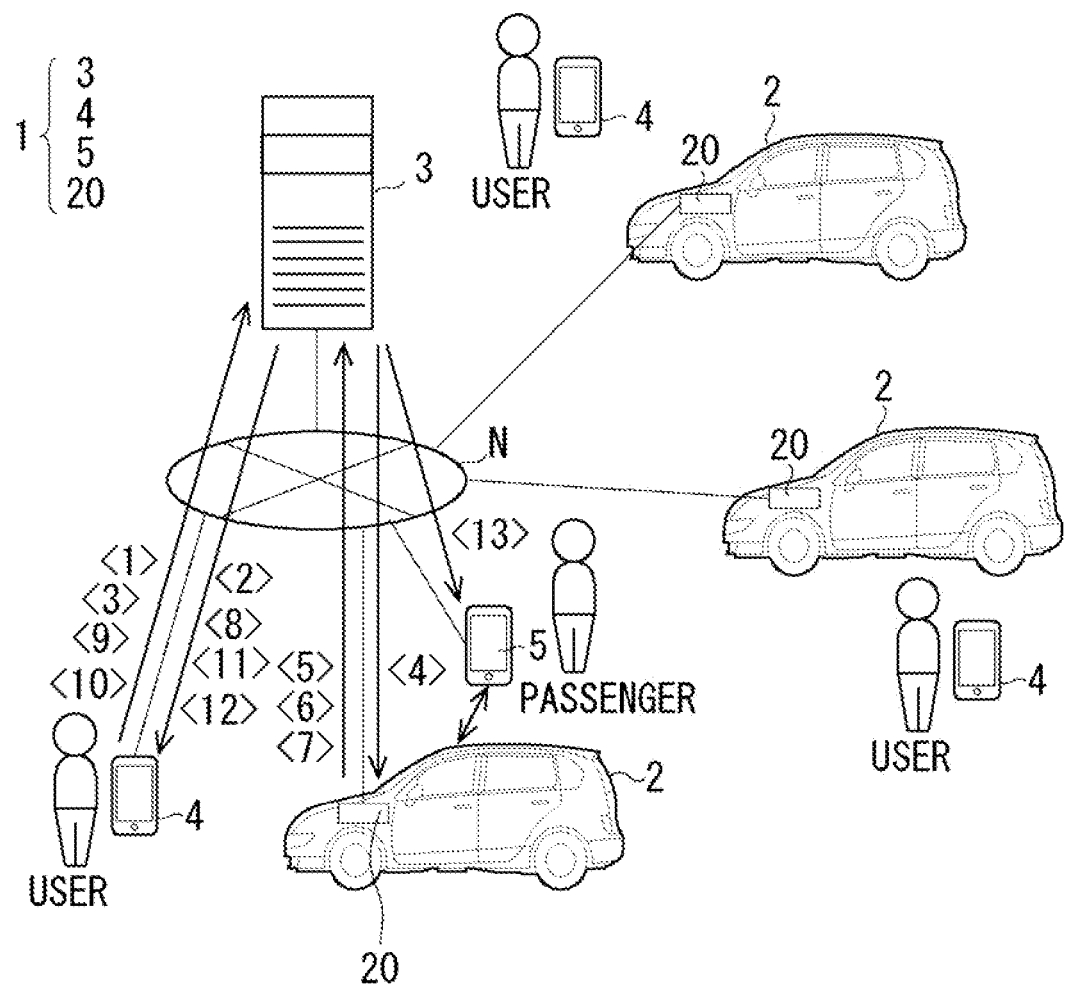

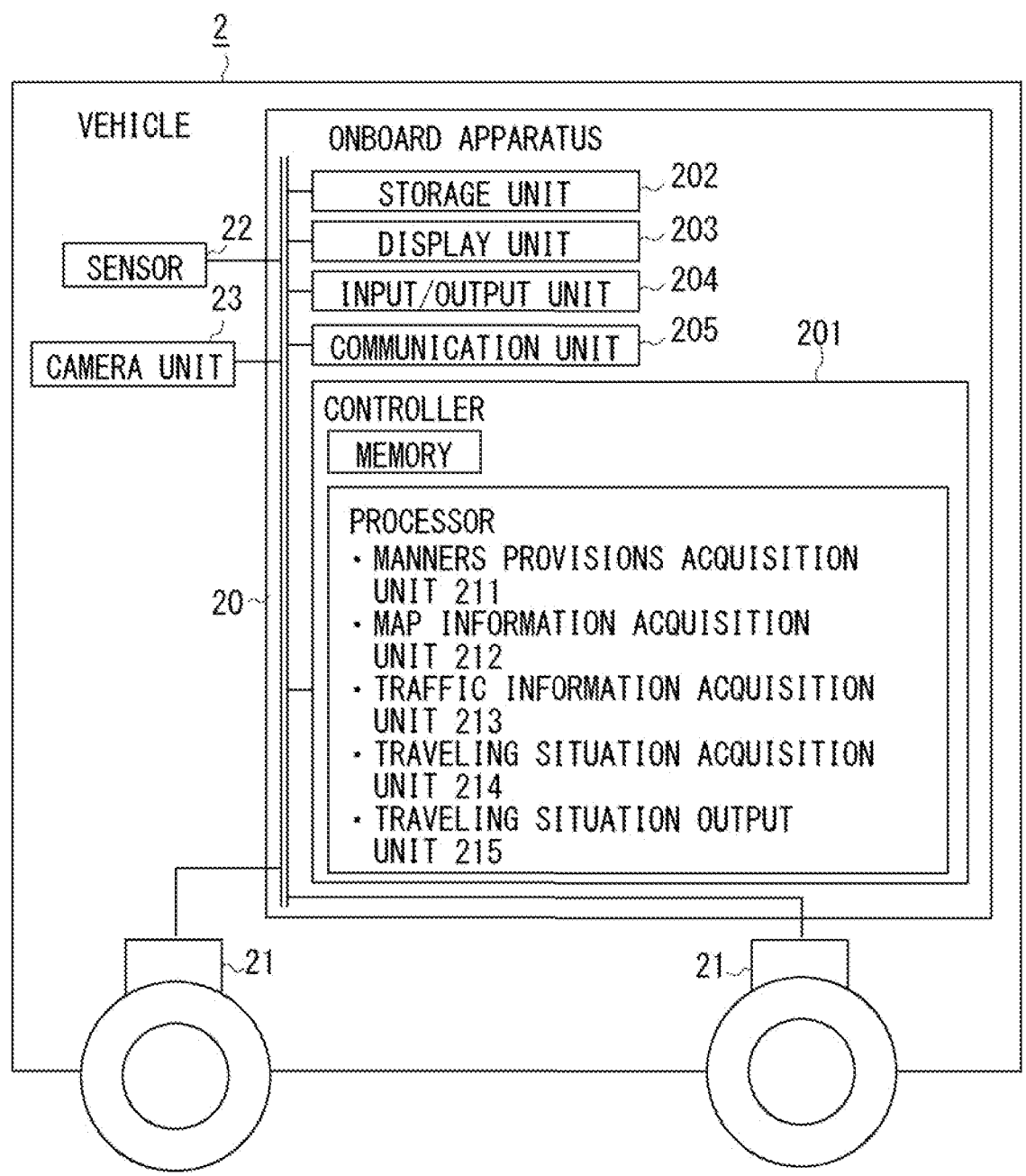

Fig. 3

| ID | CHARACTER STRING FOR DISPLAY | JUDGMENT CONDITION |
|---|---|---|
| 001 | PERFORMING CLEANING INSIDE VEHICLE | STAIN NOT BEING DETECTED AT RETURN TIME |
| 002 | CLEANING UP TRASH | TRASH NOT BEING DETECTED AT RETURN TIME |
| 003 | REPLENISH ENERGY UP TO REMAINING AMOUNT AT USE START TIME | REMAINING AMOUNT OF ENERGY AT RETURN TIME BEING EQUAL TO OR MORE THAN REMAINING AMOUNT OF ENERGY AT USE START TIME |
| 004 | OBEYING TRAFFIC RULES | TRAVELING ON GENERAL ROAD AT LESS THAN 80 km/h |
| | | STOP ONCE AT STOP POSITION |
| | | STOP AT RED SIGNAL |
| | | : |
| 005 | NOT PERFORMING DANGEROUS DRIVING | NOT TRAVELING AT SPEED OF 40 km/h OR MORE ALONG DISTANCE OF 200 m OR MORE IN STATE IN WHICH DISTANCE FROM VEHICLE AHEAD IS 4 m OR LESS |
| 006 | : | : |

Fig. 5

| DATE AND TIME \ VEHICLE ID | | TX123 | AB021 | ... |
|---|---|---|---|---|
| _TH DAY OF MONTH OF_ | 0:00~ | ▨ | ▨ | |
| | 2:00~ | ▨ | YP236 | |
| | 4:00~ | YN031 | ▨ | |
| | 6:00~ | | | |
| | 8:00~ | | | |
| | 10:00~ | | | |
| | 12:00~ | ▨ | | |
| | 14:00~ | YP119 | | |
| | 16:00~ | ▨ | | |
| | 18:00~ | | ▨ | |
| | 20:00~ | | ▨ | |
| | 22:00~ | ▨ | YP236 | |
| _TH DAY OF MONTH OF_ | 0:00~ | ▨ | ▨ | |
| | 2:00~ | ▨ | ▨ | |
| | 4:00~ | YN031 | ▨ | |
| | 6:00~ | ▨ | ▨ | |
| | 8:00~ | | ▨ | |
| | 10:00~ | | | |
| | 12:00~ | | | |
| | 14:00~ | | | |
| | 16:00~ | | | |
| | 18:00~ | | | |
| | 20:00~ | | | |
| | 22:00~ | | | |
| | | | | |
| | | | | |

Fig. 8

| USER ID | EVALUATION VALUE | PENALTY |
|---|---|---|
| YN031 | 4 | — |
| YP119 | 3 | — |
| YM260 | 1 | CAUSING WATCHER TO RIDE TOGETHER |
| YU253 | 2 | INCREASE IN USE FEE BY 10% |
| YY451 | 0 | PROHIBITION OF USE |
| : | : | : |

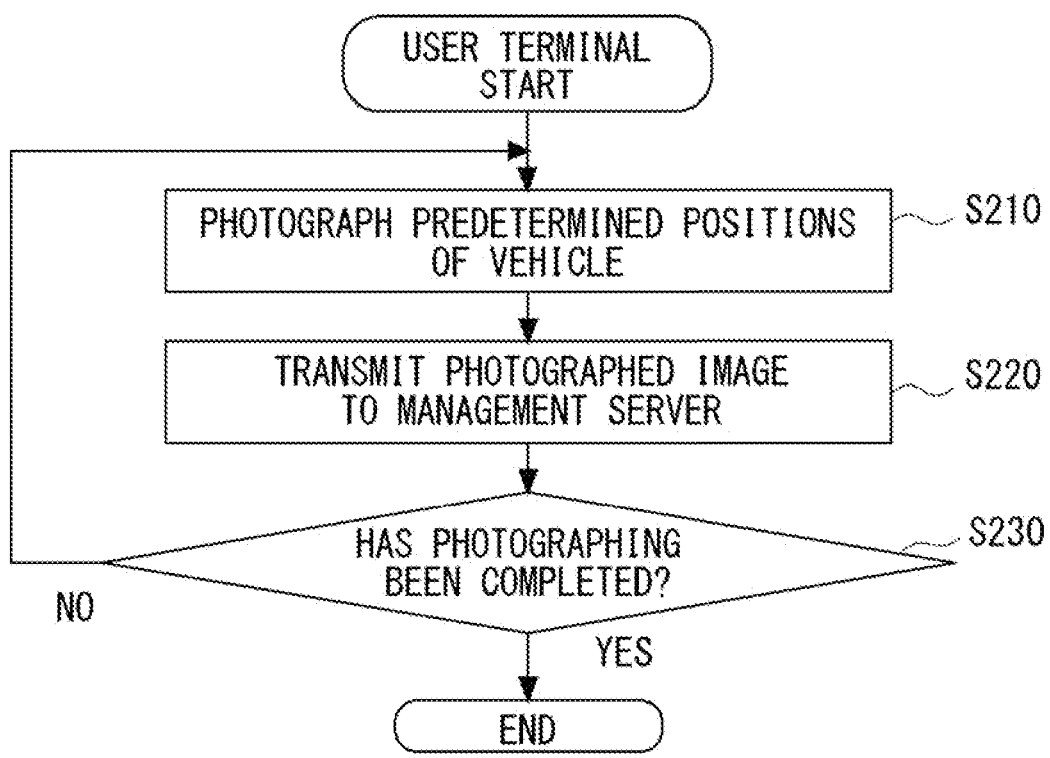

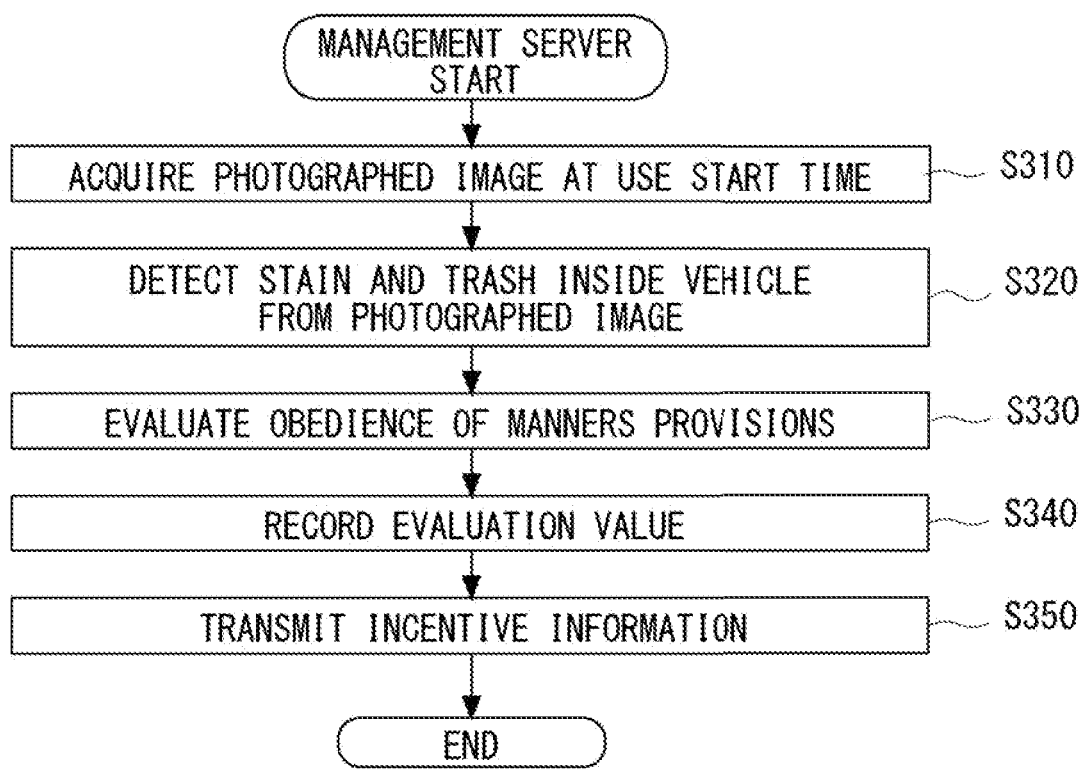

INFORMATION PROCESSING APPARATUS, INFORMATION PROCESSING METHOD AND NON-TRANSITORY RECORDING MEDIUM

CROSS REFERENCE TO THE RELATED APPLICATION

This application claims the benefit of Japanese Patent Application No. 2020-074051, filed on Apr. 17, 2020, which is hereby incorporated by reference herein in its entirety.

BACKGROUND

Technical Field

The present disclosure relates to an information processing apparatus, an information processing method and a non-transitory recording medium.

Description of the Related Art

In Japanese Patent Laid-Open No. 2019-061575, a company-employee car sharing system is described, the company-employee car sharing system being for a company to rent vehicles leased from a leasing company or owned vehicles to employees to allow personal use so that car sharing is performed between the companies and the employees.

[Patent Document 1] Japanese Patent Laid-Open No. 2019-061575

SUMMARY

One or more aspects of the present disclosure is directed to provide a technique for encouraging a user who is lent a vehicle to obey manners at time of using the vehicle.

In an information processing apparatus according to one aspect of the present disclosure, a controller including at least one processor may execute:

informing a user who is lent a vehicle of information indicating a plurality of manners provisions about use of the vehicle;

acquiring a picked-up image of the vehicle about the plurality of manners provisions at time of returning the vehicle; and calculating an evaluation value for obedience of the plurality of manners provisions, based on the picked-up image.

In an information processing method according to one aspect of the present disclosure, an information processing apparatus may execute:

informing a user who is lent a vehicle of information indicating a plurality of manners provisions about use of the vehicle;

acquiring a picked-up image of the vehicle about the plurality of manners provisions at time of returning the vehicle; and calculating an evaluation value for obedience of the plurality of manners provisions, based on the picked-up image.

In a non-transitory storage medium storing a program, according to one aspect of the present disclosure, a computer of a user who is lent a vehicle may be caused to execute:

acquiring information indicating a plurality of manners provisions about use of the vehicle;

acquiring a picked-up image of the vehicle about information indicating the plurality of manners provisions at time of returning the vehicle; and transmitting the picked-up image of the vehicle to a network.

According to the present disclosure, it is possible to provide a technique for encouraging a user who is lent a vehicle to obey manners at time of using the vehicle.

BRIEF DESCRIPTION OF THE DRAWINGS

FIG. 1 is a diagram illustrating a schematic configuration of an information processing system.

FIG. 2 is a block diagram illustrating a schematic configuration of a vehicle.

FIG. 3 is a diagram illustrating an example of manners provisions.

FIG. 5 is a diagram illustrating an example of a schedule database.

FIG. 8 is a diagram illustrating an example of an evaluation table with which evaluation of each user is registered.

FIG. 11 is a diagram illustrating a process that the user terminal executes at time of starting use of the vehicle.

FIG. 12 is a diagram illustrating a process that the management server executes at time of the vehicle being returned.

DESCRIPTION OF THE EMBODIMENT

Figure 4:
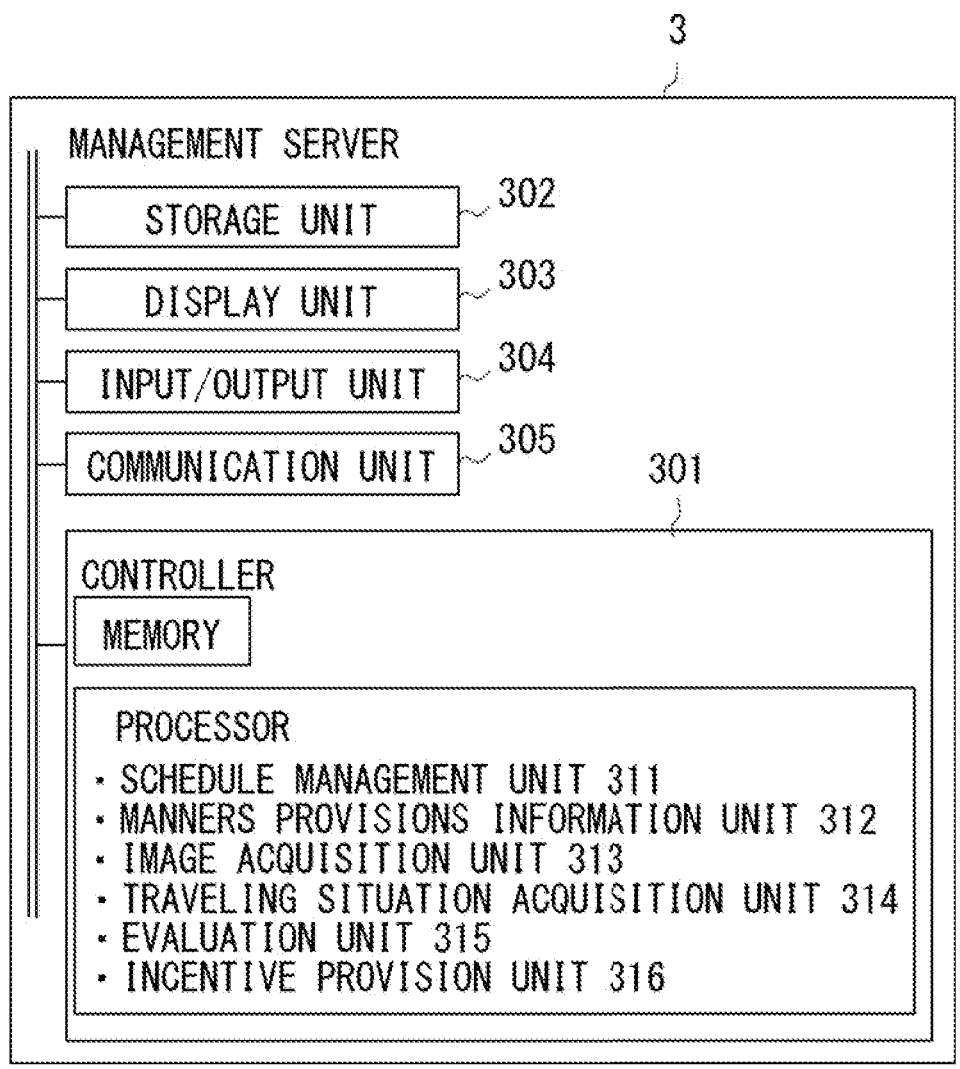
FIG. 4 is a block diagram illustrating a schematic configuration of a management server.

In an information processing apparatus of the present disclosure, a controller may execute: informing a user who is lent a vehicle of information indicating a plurality of manners provisions about use of the vehicle; acquiring a picked-up image of the vehicle about the plurality of manners provisions at time of returning the vehicle; and calculating an evaluation value for obedience of the plurality of manners provisions, based on the picked-up image.

According to an information processing apparatus of the present disclosure, it is possible to prompt a user to obey manners by making it possible to evaluate whether the user has obeyed manners provisions or not and make a response corresponding to the evaluation, for example, providing an incentive in a case where the evaluation is good or prohibiting the next use when the evaluation is bad.

In the information processing apparatus, the controller may generate incentive information corresponding an evaluation value and provide the incentive information for a user. Here, the incentive information is, for example, information indicating at least one of discount on a fee for using a vehicle, priority at time of using the vehicle, a coupon for receiving a predetermined service, points in a predetermined point system, a lot, electronic money, music, a still image and a moving image. The incentive information is not limited to the above but may be any information that is valuable for a user. Thus, the information processing apparatus of the present disclosure can induce a user to obey manners by providing an incentive when the user obeys manners provisions.

The manners provisions may include at least one of performing cleaning inside a vehicle, cleaning up trash, replenishing energy (gasoline, diesel oil, liquefied natural gas, hydrogen or electric power) up to a remaining amount at time of starting use, and not leaving anything. By setting it as manners provisions to perform necessary maintenance after use such as cleaning and cleaning up of trash as above, it is possible to complete maintenance at time of return and prevent a person to whom a vehicle is returned from feeling uncomfortable. For example, a sharing system is conceivable in which, when an employee who commutes by a vehicle 2 he personally owns does not use the vehicle 2 during working hours, the vehicle 2 is caused to be used by another employee during the working hours. However, when, after the vehicle is rented to another person during the working hours and then returned, the inside of the vehicle is dirty, or trash is scattered when the owner goes home by the vehicle, the owner will be very uncomfortable. The owner will be reluctant to provide the vehicle, and the sharing system will not work. Therefore, by encouraging a user to obey manners to prevent an owner of a vehicle from being placed at a disadvantage, it is possible to encourage the owner to provide the vehicle.

In the information processing apparatus, in a case where an evaluation value at time of a user having used a vehicle is equal to or below a threshold, the controller may generate information indicating a penalty for the user, the information being provided for the user. Thereby, it is possible to exclude a user who does not obey manners provisions and smoothly perform car sharing.

In the information processing apparatus, in a case where an evaluation value at time of a user having used a vehicle is equal to or below a threshold, the controller may generate information indicating that, when the user receives rent of a vehicle next time, the user is requested to approve that a watcher to watch the user rides together or that image pickup of an inside of the vehicle is performed during the rent of the vehicle, the information being provided for the user. Thereby, when a user with a low evaluation value uses a vehicle, it is possible to prompt the user to obey the manners provisions by causing a watcher to ride together.

In the information processing apparatus, the controller may further execute acquiring information indicating a traveling situation of the vehicle during driving of the vehicle by the user, and calculate the evaluation value for obedience of the plurality of manners provisions based on the picked-up image and the information indicating the traveling situation. Here, as the traveling situation, for example, obedience of a traveling speed, acceleration, jerk, a distance between vehicles, signals and traffic signs is given. Thereby, it is possible to evaluate not only a state of the inside of a vehicle at time of return but also whether or not manners have been obeyed during traveling.

The present disclosure can include not only an information processing apparatus but also an information processing method, a storage medium storing the program having characteristics similar to those of the information processing apparatus. Further, terminals connected to the information processing apparatus via a network may also be included in the present disclosure.

First Embodiment

An information processing system provided with an information processing apparatus according to the present embodiment will be described using drawings. The configuration of the embodiment is an example, and the information processing system is not limited to the configuration of the embodiment.

FIG. 1 is a diagram illustrating a schematic configuration of an information processing system (a company car sharing system). An information processing system 1 includes a management server 3 that manages vehicles 2, onboard apparatuses 20 provided in each vehicle 2, user terminals 4 that users of the vehicles 2 (those who receive rent of the vehicles 2) carry, and a passenger terminal 5 that a passenger carries. However, the information processing system 1 may be configured to include either the user terminals 4 or the onboard apparatuses 20. The passenger terminal 5 is optional and may not be included in the information processing system 1. However, these are not necessarily required. In the information processing system 1, vehicles 2 that a company (an enterprise) owns to use for work of the company and vehicles 2 that individuals such as employees of the company own are registered with the management server 3 to support a system that provides the vehicles 2 for use of other persons when owners do not use the vehicles 2. For example, when an employee who commutes by a vehicle 2 he personally owns does not use the vehicle 2 during working hours, the information processing system 1 causes the vehicle 2 to be used by another employee during the working hours. Further, the information processing system 1 causes the vehicles 2 the company owns to be used by individuals such as employees on company holidays or outside business hours.

In the case where vehicles 2 are rented to other persons while owners of the vehicles 2 do not use the vehicles 2 as described above, there may be a case where a user who received rent does not obey manners. Violation of manners is, for example, returning a vehicle 2 with trash left inside the vehicle 2, having used up fuel but not replenishing fuel, not returning the vehicle 2 as scheduled, or the like. When there is a user who does not obey manners, the next user (for example, an owner) is placed at a disadvantage. Therefore, the information processing system 1 of the present embodiment evaluates manners of a user at least based on a picked-up image of a vehicle 2 at time of the vehicle 2 being returned. Thereby, the information processing system 1 can prompt users to obey manners by responding to such a user with a high evaluation value as obeys manners by providing an incentive or the like.

FIG. 2 is a block diagram illustrating a schematic configuration of each vehicle 2. As illustrated in FIG. 2, the vehicle 2 is provided with equipment such as an onboard apparatus 20, a traveling apparatus 21, a sensor 22 and a camera unit 23. The traveling apparatus 21 is a mechanism that causes the vehicle 2 to travel and includes a power source, a transmission mechanism, a braking mechanism, a steering mechanism and the like. The power source generates power to cause wheels to rotate and is, for example, an internal-combustion engine or a motor, or both of them.

The transmission mechanism is a mechanism that causes the power generated by the power source to be transmitted to the wheels, and is, for example, a transmission that changes torque, a rotation rate or a rotation direction to transmit the power from an output axis of the power source to the wheels. Note that a configuration is also possible in which the wheels are directly driven by the power source without using the transmission mechanism, like a wheel-in motor.

The braking mechanism (brakes) is a mechanism that decelerates or stops rotation of the wheels in response to a driver's operation. The braking mechanism may be controlled by a cruise control apparatus, an antilock brake apparatus, a collision damage reduction brake apparatus or the like, not being limited to a driver's operation.

The steering mechanism is a mechanism that changes an orientation of the wheels to set a traveling direction of the vehicle 2 in response to a driver's operation. The steering mechanism may be controlled by a lane tracing assist apparatus or the like, not being limited to a driver's operation.

The sensor 22 includes sensors that detect at least one of states of the vehicle 2 and surrounding states, such as a vehicle speed sensor, an acceleration sensor, an orientation sensor, a rainfall sensor, a temperature sensor, an obstacle sensor, a position sensor, a sensor that detects a remaining amount of fuel and a sensor that detects a remaining amount of power for traveling. The obstacle sensor may be a camera, a radar, a LiDAR (laser imaging and ranging) or the like. The position sensor is a sensor that detects a current position of the vehicle 2. The position sensor may be, for example, a positioning apparatus in a satellite positioning system such as a GPS receiver. Further the sensor 22 may include a sensor that detects an operating condition of a braking apparatus, an antilock brake apparatus, a collision damage reduction brake apparatus or a lane tracing assist apparatus.

The camera unit 23 refers to a plurality of cameras that pick up images in the forward direction of the vehicle 2, in the backward direction of the vehicle 2 and of the inside of a vehicle cabin of the vehicle 2, respectively. The camera unit 23 is not limited to the above but may be a single camera that picks up an image of the outside of the vehicle 2 or the inside of the vehicle cabin. The camera unit 23 may be further provided with a camera that picks up an image in the lateral directions of the vehicle 2. Further, the camera unit 23 may include a plurality of cameras that pick up images of the inside of the vehicle cabin such as a camera that picks up an image of an area around an instrument panel, a camera that picks up an image of a floor mat and a camera that picks up an image of the inside of a trunk.

The onboard apparatus 20 is a computer mounted on the vehicle 2 and is provided with a controller 201, a storage unit 202, a display unit 203, an input/output unit 204 and a communication unit 205.

The controller 201 controls an operation of the whole onboard apparatus 20 and realizes various kinds of functions the onboard apparatus 20 includes. The controller 201 is provided, for example, with a processor and memories. The processor comprehensively controls operations of the onboard apparatus 20. The processor is also called a CPU, an MPU or the like. The memories are, for example, a ROM and a RAM. The ROM is a storage medium that stores various kinds of programs or data. The RAM is a storage medium that temporarily stores various kinds of programs and data. The RAM may be directly accessed from the processor, and function as a main memory.

The storage unit 202 is a storage device such as an HDD or an SSD. The storage unit 202 functions as an external storage device of the controller 201. The storage unit 202 stores map information, route information, setting information by an administrator or the like. The display unit 203 is means for displaying information and is, for example, a liquid crystal display device, an organic EL display device or the like. The display unit 203 is provided in the vehicle 2 and performs display for persons in the vehicle 2.

The input/output unit 204 is a device that performs input/output of information to/from the controller 201 and performs, for example, acceptance of an operation from a user and output of information to the user. The input/output unit 204 as, for example, buttons, a keyboard, a touch panel, a display unit, speakers or the like. The communication unit 205 is a communication interface for performing communication with external apparatuses via a communication line. The communication unit 205 may be provided with a plurality of communication interfaces such as a communication interface that performs communication directly with other apparatuses in addition to the communication interface that performs communication via a communication network. As the communication interface that performs communication directly with other apparatuses, a communication interface that performs communication using an ad hoc mode of Bluetooth (registered trademark), ZigBee (registered trademark) or Wi-Fi (registered trademark) is given. Further, the communication unit 205 may be a communication interface that performs communication using business-use radio (simplicity radio).

In the controller 201, the processor executes a program stored in the ROM, the storage unit 202 or the like, with the RAM as a work area. By executing this program, the controller 201 functions as a manners provisions acquisition unit 211, a map information acquisition unit 212, a traffic information acquisition unit 213, a traveling situation acquisition unit 214, a traveling situation output unit 215 and the like. Processes or operations of the controller 201 may be realized by a plurality of processors or a plurality of cores included in a single processor. Further, a single processor may realize the processes or operations of the controller 201 by technology such as multitasking or multithreading.

The manners provisions acquisition unit 211 acquires information indicating manners provisions from the management server 3 and causes the display unit 203 to display the manners provisions. FIG. 3 is a diagram illustrating an example of the manners provisions. As illustrated in FIG. 3, each of the manners provisions includes information such as an ID, a character string for display and a judgment condition. The judgment condition is a condition to judge whether the manners provision is obeyed or not based on information acquired from the sensor 22 and the camera unit 23. Note that, though the judgment conditions are indicated by natural language in the example of FIG. 3 for convenience of description, the judgment conditions may be written as commands or conditional expressions that the controller can recognize. Note that, when the manners provisions judgment is not performed on the onboard apparatus 20 side, the manners provisions acquisition unit 211 does not have to acquire the judgment conditions.

The map information acquisition unit 212 acquires attribute information about a road at a current position from map information stored in the storage unit 202. The road attribute information is, for example, information indicating classification about whether a general road or an expressway (road classification), one-way traffic, a right/left turn lane or the like.

The traffic information acquisition unit 213 acquires traffic information by the communication unit 205 or the camera unit 23. The traveling situation acquisition unit 214 acquires information indicating a traveling situation of the vehicle 2 by the sensor 22 and the camera unit 23. The traveling situation output unit 215 transmits the traveling situation acquired by the traveling situation acquisition unit 214, to the management server 3.

FIG. 4 is a block diagram illustrating a schematic configuration of the management server 3. The management server 3 is a computer that manages the vehicles 2 and is provided with a controller 301, a storage unit 302, a display unit 303, an input/output unit 304 and a communication unit 305. As the controller 301, the storage unit 302, the display unit 303, the input/output unit 304 and the communication unit 305, those similar to the controller 201, the storage unit 202, the display unit 203, the input/output unit 204 and the communication unit 205 of the onboard apparatus 20 illustrated in FIG. 2 can be applied. However, according to difference in required capability, those that are different in performance, quantity, classification and the like may be applied.

By executing a program, the controller 301 functions as functional units such as a schedule management unit 311, a manners provisions information unit 312, an image acquisition unit 313, a traveling situation acquisition unit 314, an evaluation unit 315 and an incentive provision unit 316.

The schedule management unit 311 accepts a request to use a vehicle 2 from a user terminal 4 and registers the request with a schedule database (DB). FIG. 5 is a diagram illustrating an example of the schedule DB. In the schedule DB of FIG. 5, a use date and time is recorded for each of the vehicles 2 that are identified by vehicle IDs. In FIG. 5, each of hatched parts indicates a period of use, and a user ID recorded in each of hatched cells indicates a user who uses the vehicle 2. For example, in the example of FIG. 5, it is indicated that a vehicle 2 with a vehicle ID of TX123 is used by a user YN031 until 10:00 on _____ th day of month of _____ and, next, the vehicle 2 is used from 12:00 to 18:00 on _____ th day of month of _____.

At a predetermined timing, such as at time of accepting a use request, at time of starting use, or the like, the manners provisions information unit 312 reads out manners provisions from the storage unit 302, transmits the manners provisions to the user terminal 4 or the onboard apparatus 20 to cause the manners provisions to be displayed, and informs a user of information indicating the plurality of manners provisions about use of the vehicle. The image acquisition unit 313 acquires a picked-up image at use start time or return time of the vehicle 2, from the onboard apparatus 20 or the user terminal 4. The traveling situation acquisition unit 314 acquires information indicating a traveling situation from the onboard apparatus 20. The evaluation unit 315 calculates an evaluation value for obedience of the manners provisions based on the picked-up image acquired by the image acquisition unit 313 and the traveling situation information acquired by the traveling situation acquisition unit 314. The incentive provision unit 316 generates incentive information according to the evaluation value determined by the evaluation unit 315 and provides the incentive information for the user. The incentive information is, for example, information indicating at least one of discount on a fee for using the vehicle 2, a coupon for receiving a predetermined service, points in a predetermined point system, a lot, electronic money, music, a still image and a moving image.

User Terminal

Figure 6:
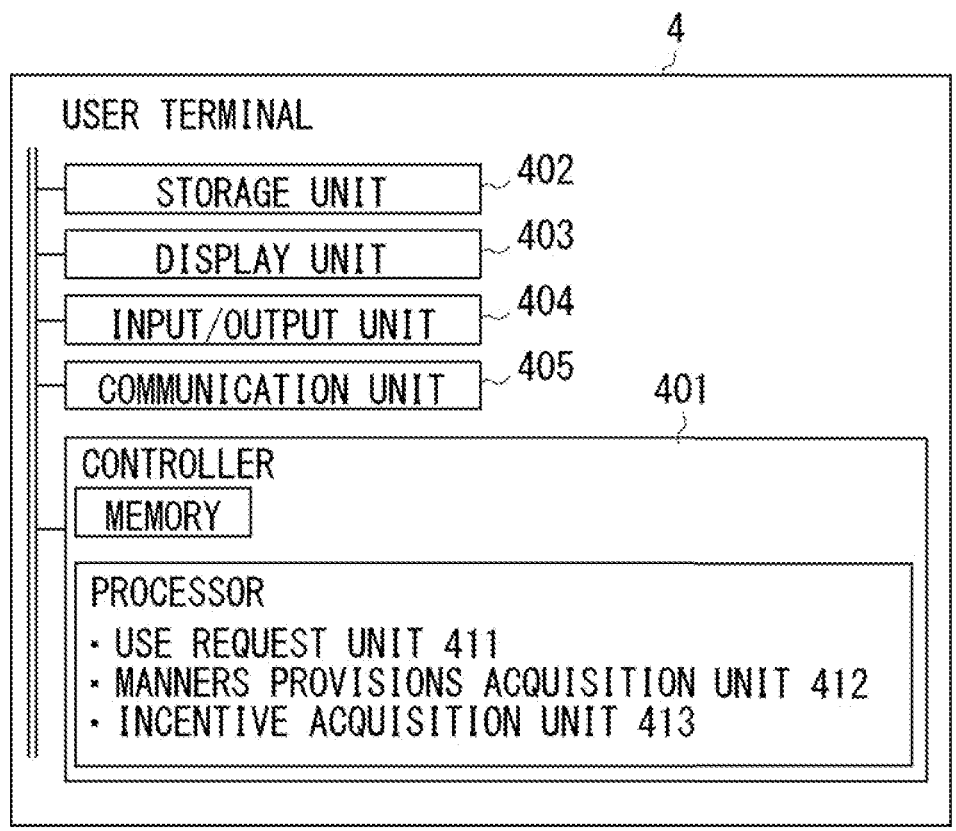
FIG. 6 is a block diagram illustrating a schematic configuration of a user terminal.

FIG. 6 is a block diagram illustrating a schematic configuration of each user terminal 4. The user terminal 4 is a computer that manages a vehicle 2 and is provided with a controller 401, a storage unit 402, a display unit 403, an input/output unit 404 and a communication unit 405. As the controller 401, the storage unit 402, the display unit 403, the input/output unit 404 and the communication unit 405, those similar to the controller 201, the storage unit 202, the display unit 203, the input/output unit 204 and the communication unit 205 of the onboard apparatus 20 illustrated in FIG. 2 can be adopted. However, according to difference in required capability, those that are different in performance, quantity, classification and the like may be applied. The input/output unit 404 includes a camera that performs image pickup in response to a user's operation.

In the controller 401, the processor executes a program stored in the ROM, the storage unit 402 or the like, with the RAM as a work area. By executing this program, the controller 401 functions as functional units such as a use request unit 411, a manners provisions acquisition unit 412 and an incentive acquisition unit 413.

The use request unit 411 connects to the management server 3 via a network to transmit a use request. For example, when the user inputs a use start date and time and a return date and time using input means, the use request unit 411 transmits these and a user ID to the management server 3 as a use request. When the use request is accepted, the use request unit 411 receives information about a vehicle 2 that has been registered, the use start date and time, the return date and time and the like from the management server 3.

The manners provisions acquisition unit 412 acquires manners provisions from the management server 3 and causes the display unit 403 to display the manners provisions. A timing of acquiring the manners provisions may be a timing at which the use request is made, the use start date and time or a predetermined time before the use start date and time, or these plurality of timings.

The incentive acquisition unit 413 acquires incentive information from the management server 3 after the vehicle 2 is returned. Note that, when the incentive information is electronic money, points of an existing point system or the like and is acquired by other means, the incentive acquisition unit 413 may be omitted.

Passenger Terminal

The passenger terminal 5 is a computer for communicating with the management server 3 via a communication line to receive a notification of riding together with a user with a low evaluation value, from the management server 3. Note that, when the notification of riding together is made by general communication means such as an e-mail or a short message service (SMS), a general mobile phone, a smartphone, a tablet terminal or the like can be used as the passenger terminal 5. Therefore, a description of a detailed configuration of the passenger terminal 5 will be omitted.

Note that, when the passenger is also registered with the management server 3 as a user, the passenger's user terminal 4 can be used as the passenger terminal 5. In this case, the same value as an evaluation value for the user at time of returning the vehicle 2 may be recorded as an evaluation value for the passenger. Thereby, the passenger takes responsibility similarly to the user, and it is possible to motivate the passenger to encourage the user to obey manners provisions. In this case, furthermore, incentive information may be also issued for the passenger according to the evaluation value so that the incentive information can be acquired by the passenger terminal 5 (the user terminal 4) the passenger uses.

Information Processing Method

Next, a description will be made on a procedure for the management server 3, a user terminal 4 and an onboard apparatus 20 to execute an information processing method according to the present embodiment in accordance with a program, using FIG. 1, and FIGS. 7 to 10.

In the case of renting a vehicle 2, the user inputs information such as time at which he wants to start use (use start time), time at which the user plans to return the vehicle 2 (return time) to the user terminal 4, and the user terminal 4 transmits the information to the management server 3 as a use request (FIG. 1<1>). Receiving the use request, the management server 3 refers to the schedule DB to extract a vehicle 2 that is not scheduled to be used, that is, an available vehicle 2 in response to the use request.

Further, the management server 3 transmits information indicating manners provisions to be obeyed in the case of renting the vehicle 2 (use manners information) to the user terminal 4 (FIG. 1<2>) and informs the user of the manners provisions by causing the user terminal 4 to display the manners provisions.

When the user confirms the manners information and performs an operation of acknowledgement on the user terminal 4, the user terminal 4 transmits the acknowledgement notification to the management server 3 (FIG. 1<3>). Receiving the acknowledgement notification, the management server 3 registers a use schedule such as time of starting use of and time of returning the vehicle 2 extracted according to the use request with the schedule DB. At this time, the management server 3 may transmit information indicating the accepted use schedule and the manners provisions to the onboard apparatus 20 (FIG. 1<4>).

The onboard apparatus 20 photographs a state of the inside of the vehicle 2 at time of starting use of the vehicles 2, and transmits the image to the management server 3 as a photographed image at use start time (FIG. 1<5>). Here, the photographed image is an image obtained by photographing a predetermined position of the vehicle 2 such as seats, a floor mat, a trash box, a drink holder or the like. Further, the onboard apparatus 20 acquires information about surroundings of the vehicle 2 from the sensor 22 during traveling and transmits the information to the management server 3 as a traveling situation at time of return (FIG. 1<6>). Furthermore, the onboard apparatus 20 photographs a state of the inside of the vehicle 2 at the time of return and transmits the image to the management server 3 as a photographed image at return time (FIG. 1<7>).

Meanwhile, the user terminal 4 acquires an image to be a sample for photographing (a reference image) at the time of starting use (FIG. 1<8>), presents this reference image to the user for the user to pick up an image of the vehicle 2 in the same composition. Then, the user terminal 4 transmits the picked-up image to the management server 3 as a photographed image at use start time (FIG. 1<9>). Similarly, the user terminal 4 causes the user to pick up an image of the vehicle 2 at the time of return to acquire a picked-up image at return time, and transmits the image to the management server 3 (FIG. 1<10>).

Figure 7:
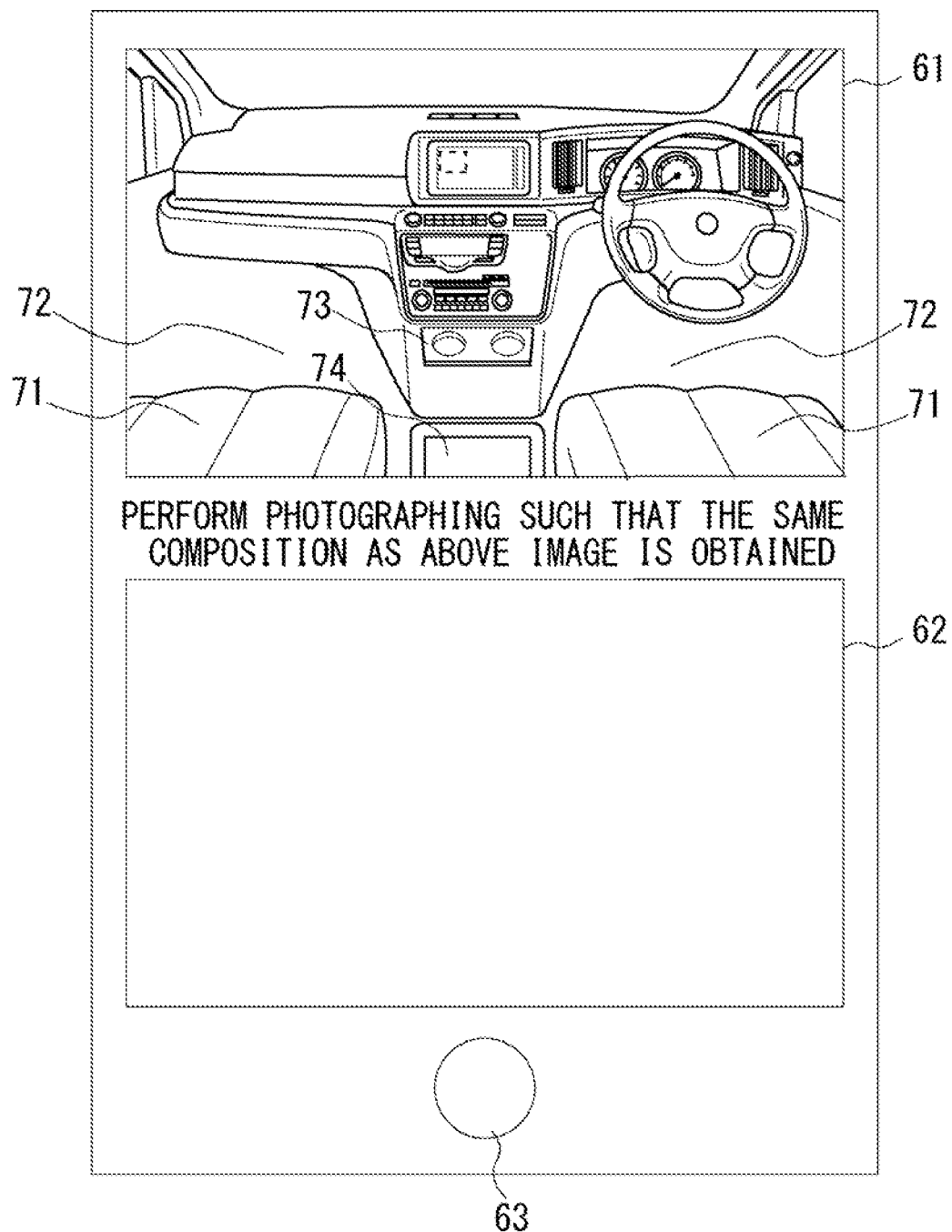
FIG. 7 is a diagram illustrating an example of a user interface in which the user terminal presents a reference image to a user to encourage the user to perform image pickup in the same composition.

FIG. 7 is a diagram illustrating an example of a user interface in which the user terminal 4 presents the reference image to the user to encourage the user to perform image pickup in the same composition. In FIG. 7, a display field 61 for causing the reference image to be displayed is arranged on an upper part of a screen, and a display field 62 for displaying an image obtained by an image pickup device of the camera in real time as arranged in the same shape as the display field 61. An image pickup button 63 is a button for causing an image picked up by the camera of the user terminal 4 to be stored into the storage unit 402. Here, the reference image is, for example, an image obtained by picking up an image of predetermined positions such as a sitting surface 71 of a seat, a floor mat 72, a drink holder 73 and a trash box 74 in a state of being cleaned beforehand or a state without trash inside the vehicle 2.

With the reference image in the display field 61 as a sample, the user adjusts an orientation of the camera and a photographing position so that an image appearing in the display field 62 is in the same composition as the image in the display field 61, and selects an image pickup button 63 when the same composition is obtained. Thereby, the user terminal 4 acquires a picked-up image at use start time or at return time, which has been picked up in the same composition as the reference image, and transmits the image to the management server 3.

Receiving the picked-up image at return time, the management server 3 compares the photographed image at use start time with the photographed image at return time, calculates an evaluation value based on a difference therebetween, generates incentive information based on the evaluation value, and transmits the incentive information to the user terminal 4 (FIG. 1<11>). Note that, when this evaluation value is low, that is, when the user does not obey the manners provisions, the management server 3 generates information indicating a penalty (penalty information), stores the penalty information into the storage unit 302 and transmits the penalty information to the user terminal 4 (FIG. 1<12>). Thereby, when the user requests use of a vehicle 2 next time, the management server 3 notifies the user of an extra use fee, riding of a watcher, image pickup of the inside of the vehicle 2 or the like during rent of the vehicle 2 as a penalty based on the penalty information. Further, when riding of a watcher becomes necessary, the management server 3 selects a watcher (a passenger) and notifies a passenger terminal 5 used by the selected passenger of riding in the vehicle 2 and a schedule for the riding (FIG. 1<12>).

FIG. 8 is a diagram illustrating an example of an evaluation table with which evaluation of each user is registered. The evaluation table of FIG. 8 is a data table in which an ID, an evaluation value and penalty information for each user are associated and registered. The evaluation value registered with the evaluation table is a value obtained by performing statistical processing of evaluation values at time of use in the past, for example, a mean, a mode, a median or the like. The penalty information is information indicating a penalty set according to an evaluation value, such as an extra use fee, riding of a watcher, image pickup of the inside of the vehicle 2 during rent, prohibition of use or the like. For example, in a case where the management server 3 presents five manners provisions, and the number of manners provisions that a user has obeyed is set as an evaluation value, the management server 3 issues incentive information when the evaluation value is 3 to 5 and issues penalty information when the evaluation value is 0 to 2. Further, in the management server 3, content of the penalty may be specified according to an evaluation value, such as that the use fee is increased by 10% when the evaluation value is 2, that image pickup of the inside of the vehicle 2 is to be performed when the evaluation value is 1, and that a watcher is to ride together when the evaluation value is 0. Furthermore, the management server 3 may specify the content of the penalty based on an evaluation value at the time of a user having used a vehicle 2 a plurality of times, for example, prohibiting use when the evaluation value is 1 or less twice in a row.

Figure 9:
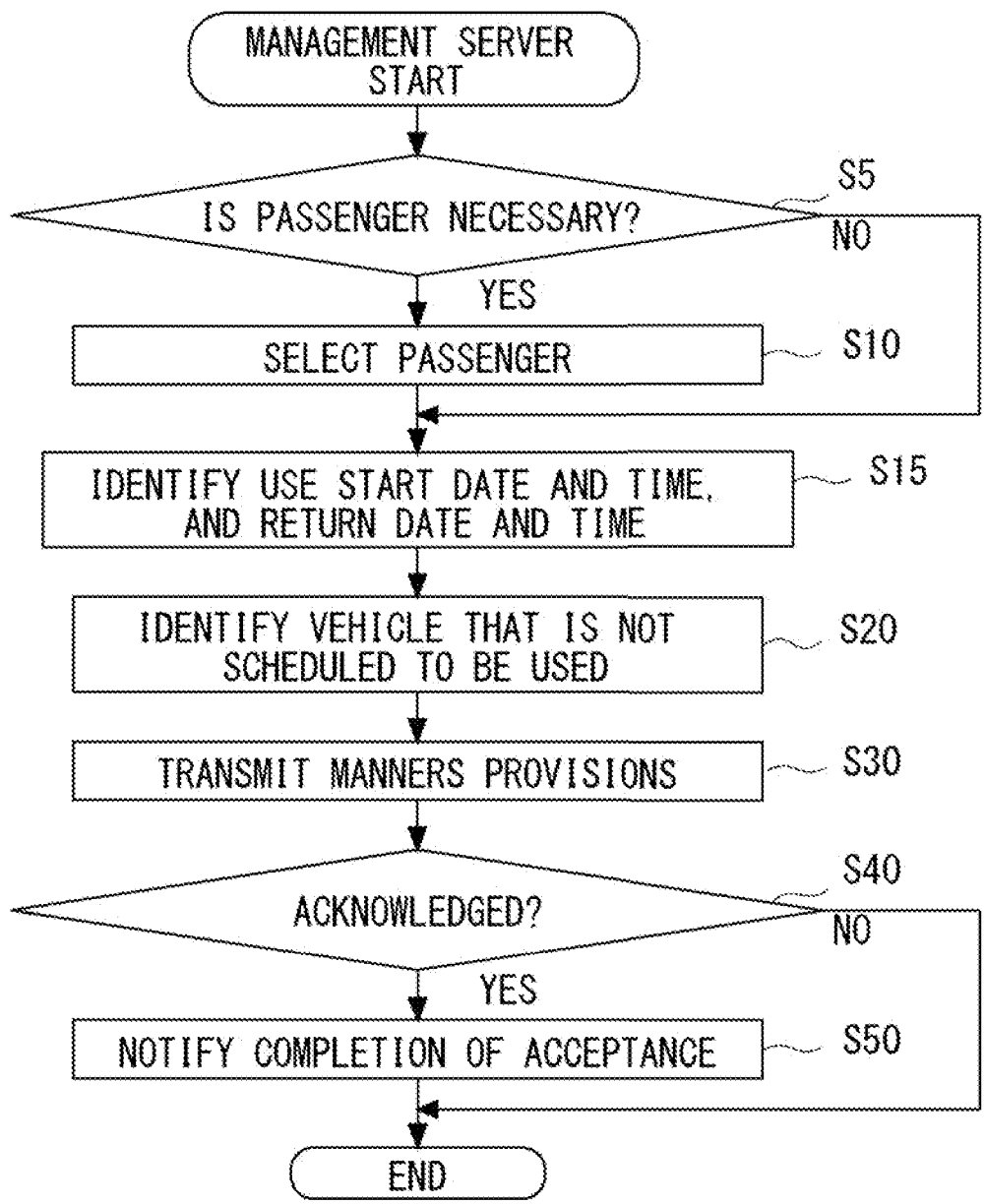
FIG. 9 is a diagram illustrating a process that the management server executes when receiving a use request.

FIG. 9 is a diagram illustrating a process that the controller 301 of the management server 3 executes when receiving a use request. When receiving a use request from a user terminal 4, the controller 301 starts the process of FIG. 9. At step S5, the controller 301 refers to the evaluation table, reads out penalty information about the user, and judges whether a passenger (a watcher) is necessary or not.

In the case of a positive judgment at step S5, the controller 301 transitions to step S10 and selects at least one of passengers registered with the storage unit 302. On the other hand, in the case of a negative judgment at step S5, the controller 301 transitions to step S15. At step S15, the controller 301 identifies a use start date and time and a return date and time included in the received use request.

At step S20, the controller 301 refers to the schedule DB and identifies a vehicle 2 for which no other schedule is recorded, that is, a vehicle 2 that is not scheduled to be used during a period from the use start date and time to the return date and time. For example, when receiving a user ID, a use start date and time and a return date and time as a use request from the user terminal 4, the controller 301 refers to the schedule DB and determines a vehicle 2 for which no other schedule is recorded during a period from the use start date and time to the return date and time.

At step S30, the controller 301 reads out manners provisions set for the vehicle 2 identified at step S20 from the storage unit 302 and transmits the manners provisions to the request-source user terminal 4. Note that manners provisions may be set for each vehicle 2. In this case, the manners provisions for each vehicle 2 may be arbitrarily set by an owner of the vehicle 2. For example, the owner inputs manners provisions, such as "replenishing energy for traveling up to an amount at time of starting use" and "not performing tailgating", using the display unit 403 and input/output unit 404 of his user terminal 4, and the user terminal 4 transmits the manners provisions to the management server 3 via a network N. Further, the owner may input manners provisions such as "not having scratched exterior parts", "not having made interior parts dirty" or "not leaving anything" to the user terminal 4 so that his user terminal 4 transmits the manners provisions to the management server 3. The controller 301 of the management server 3 registers the manners provisions with the storage unit 302 as information indicating the manners provisions for the vehicle 2 in association with a vehicle ID. For example, when the owner of the vehicle 2 prohibits tailgating though he does not request the energy for traveling to be replenished up to an amount at time of starting use, the owner selects and transmits the manners provision of "not performing tailgating" or the like without selecting "replenishing energy for traveling up to an amount at time of starting use". Thereby, the owner arbitrarily selects manners provisions for the vehicle 2 that he owns and causes the management server 3 to set the manners provisions. The controller 301 confirms the penalty information about the user and, when photographing of the inside of the vehicle 2 during rent is necessary, transmits an indication to photograph the inside of the vehicle 2 during rent to the user's user terminal 4, together with the manners provisions. The user terminal 4 notified of the manners provisions or the indication to photograph the inside of the vehicle 2 during rent (hereinafter also referred to as the manners provisions and the like) displays the manners provisions and the like and prompts the user to input whether he acknowledges the manners provisions and the like or not. When the user makes an input of acknowledgement, the user terminal 4 transmits a notification of acknowledgement of the manners provisions and the like (an acknowledgement notification) to the management server 3.

At step S40, the controller 301 judges whether the notification of acknowledgement of the manners provisions and the like has been received from the user terminal 4 or not.

In the case of a negative judgment at step S40, the management server 3 ends the process of FIG. 9. On the other hand, in the case of a positive judgment at step S40, the controller 301 transitions to step S50 and registers the use start date and time, the user ID and the return date and time with the schedule of the vehicle 2 identified at step S20. The controller 301 transmits that the use request has been accepted with this schedule to the user terminal 4 and the onboard apparatus 20 of the vehicle 2 to be rented. Note that, when a passenger has been selected at step S10, a passenger terminal 5 of the passenger is also notified of the use start date and time, the user ID, the vehicle ID and the return date and time.

Figure 10:
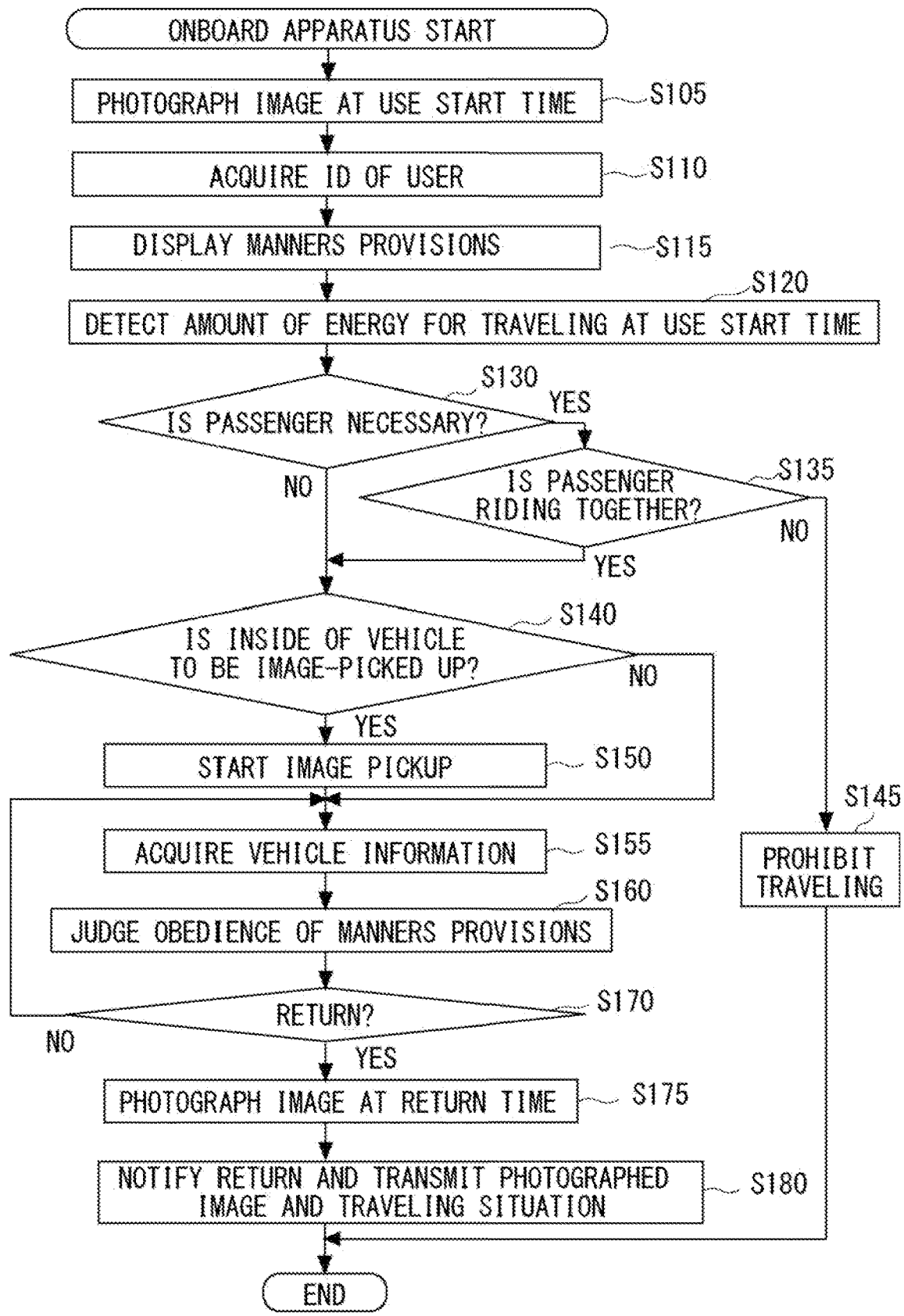
FIG. 10 is a diagram illustrating a process that an onboard apparatus executes when the vehicle is used by the user.

FIG. 10 is a diagram illustrating a process that the controller 201 of the onboard apparatus 20 executes when a vehicle 2 is used by a user. When a door of the vehicle 2 is unlocked, when an accessory power supply is turned ON, or when an input indicating start of use is made by the user, the controller 201 starts the process of FIG. 10. Note that the onboard apparatus 20 may be configured to, when the management server 3 accepts a use request, receive a use schedule (use start time, return time, a user's ID, penalty information and the like) from the management server 3.

At step S105, the controller 201 picks up an image of the inside of the vehicle 2 by the camera unit 23 and acquires the picked-up image as a picked-up image at use start time. For example, the camera unit 23 is provided with a plurality of cameras for photographing predetermined positions such as sitting surfaces of seats, a floor mat, a trash box or a drink holder, and picks up images of the plurality of predetermined positions by the plurality of cameras, respectively. Note that, in the case of using a picked-up image picked up at the last return time as a current picked-up image at use start time or in the case of using a picked-up image registered in advance (a reference image) as a picked-up image at use start time, step S105 may be omitted.

At step S110, the controller 201 acquires an ID of the user. For example, a message like "Input your ID" is displayed to the user, and the user operates an operation unit of the onboard apparatus 20 to input an ID. The controller 201 may receive the user's ID by communicating with the user's user terminal 4.

At step S115, the controller 201 acquires manners provisions from the management server 3 and causes the display unit 203 to display the manners provisions to present the manners provisions to the user. Note that, when the manners provisions are stored in the storage unit 202 of the onboard apparatus 20 in advance, the manners provisions may be read out from the storage unit 202 and displayed instead of being acquired from the management server 3.

At step S120, the controller 201 detects a remaining amount of fuel, power for traveling, or both of them (hereinafter referred to as energy for traveling) by the sensor 22 and stores the remaining amount into the storage unit as a remaining amount at time of starting use. Note that, when the provision of "replenishing energy for traveling up to an amount at time of starting use" is not set among the manners provisions for the vehicle 2, step S130 may be omitted. Further, when an amount of energy for traveling detected at the last return time is used as the current amount at use start time, step S120 may be omitted.

At step S130, the controller 201 judges whether a passenger (a watcher) is necessary or not based on the information received from the management server 3. In the case of a negative judgment at step S130, the process transitions to step S140. In the case of a positive judgment at step S130, the process transitions to step S135, where it is judged whether a passenger is riding together or not. As for the judgment about whether a passenger is riding together or not, for example, communication with the passenger's passenger terminal 5 is performed with a short-range radio system such as Bluetooth (registered trademark) or Wi-Fi (registered trademark), and it is judged that a passenger is riding together when communication is possible. Without being limited to the above, the management server 3 may transmit an authentication code to the passenger terminal 5 and the onboard apparatus 20 so that authentication codes may be compared. In this case, the passenger inputs the authentication code received by the passenger terminal 5 to the onboard apparatus 20, and it is judged whether the passenger is riding together or not by whether the authentication code the onboard apparatus 20 has received from the management server 3 and the authentication code inputted by the passenger correspond to each other. In the case of a positive judgment at step S135, the process transitions to step S140. In the case of a negative judgment at step S135, the process transitions to step S145, where traveling by the traveling apparatus 21 is prohibited, and the process of FIG. 10 ends.

At step S140, the controller 201 judges whether image pickup of the inside of the vehicle 2 is to be performed during rent or not based on the information received from the management server 3. In the case of a negative judgment at step S140, the process transitions to step S155. In the case of a positive judgment at step S10, the process transitions to step S150, where image pickup of the inside of the vehicle 2 by the camera unit 23 is started.

At step S155, the controller 201 detects information about the vehicle 2 during traveling as vehicle information, using the sensor 22 and the camera unit 23. The vehicle information is, for example, information indicating a vehicle speed, acceleration and jerk of the vehicle 2, an amount of operation (an amount of depression) of a brake operated by the user, an amount of operation of a steering, ON/OFF of headlights or an operation state of a direction indicator. Further, the vehicle information is information indicating the number of operations of an antilock brake apparatus or the number of operations of a collision damage reduction brake apparatus. Further, the traveling situation may be the highest value (the highest speed) among traveling speeds between start of use and return. Furthermore, the traveling situation may be the number of times the jerk exceeds a predetermined value (the number of times of sudden acceleration or sudden deceleration). Furthermore, the controller 201 acquires traffic information such as a speed limit of a road where the vehicle 2 is traveling, a state of a traffic signal, a stop sign, and entry prohibition outside the designated direction, from access points on a road side via the communication unit 205. Further, the controller 201 performs image processing of a picked-up image picked up by the camera unit 23 to acquire road information indicated by a road sign or a state of a traffic signal in the picked-up image as traffic information. For example, the controller 201 extracts a speed indication sign provided on a road where the vehicle 2 is traveling, from the picked-up image, performs character recognition of a numeral in the sign and acquires the numeral as a speed limit. Further, the controller 201 extracts an image of a traffic signal from the picked-up image, identifies color of light of the traffic signal and acquires the color as a state of the traffic signal. Hereinafter, a red light of a traffic signal being on will be referred to as a red traffic light.

At step S160, the controller 201 judges whether manners provisions during traveling are being obeyed or not based on the vehicle information, and records a judgment result as traveling manners information. For example, when the vehicle 2 travels exceeding a speed limit acquired from a picked-up image picked up by the camera unit 23 or an access point on the road side, it is judged that a manners provision (obeying traffic rules) is not obeyed. Further, in a case where the vehicle 2 travels without stopping at a stop position, a case where the vehicle 2 passes through an intersection at a red traffic light, or the like is detected, the controller 201 judges that the manners provision (obeying traffic rules) is not obeyed.

Further, in a case where the vehicle 2 travels at a speed of 40 km/h or higher along a distance of 200 m or more in a state in which a distance from a vehicle ahead is 4 m or less (tailgating), it is judged that a manners provision (not performing dangerous driving) is not obeyed. Manners judgment information may be such that whether each manners provision is obeyed or not is recorded, such that only obeyed manners provisions are recorded or such that only manners provisions that are not obeyed are recorded.

At step S170, the controller 201 judges whether return has been selected by the user or not. Note that selection of return may be judged to have been made, in a case where it is detected that the vehicle 2 has returned to a return place and stopped, based on a position of the vehicles 2, in addition to a case where the user selects return by operating a button or the like of the onboard apparatus 20. In the case of a negative judgment at step S170, the controller 201 repeats steps S155 and S160.

In the case of a positive judgment at step S170, the controller 201 transitions to step S175 and picks up an image of the inside of the vehicle 2 by the camera unit 23 to acquire a picked-up image at return time. Note that the picked-up image is an image obtained by picking up an image of a predetermined position such as a floor mat, the inside of a trash box or a drink holder. The picked-up image may he video of the user performing cleaning.

At step S160, the controller 201 notifies the management server 3 of return of the vehicle 2 and transmits the picked-up image at use start time (S105), a picked-up image obtained by starting image pickup at step S150 and the picked-up image at return time (S175) to the management server 3 in association with a user ID. Further, the controller 201 transmits the vehicle information detected at step S140 and the traveling manners information, which is a judgment result of step S160, to the management server 3 as the traveling situation.

FIG. 11 is a diagram illustrating a process that a user terminal 4 executes at time of starting use of a vehicle 2. When start of use is selected by the use, the user terminal 4 executes the process of FIG. 11. At step S210, the controller 401 of the user terminal 4 picks up an image of predetermined positions according to manners provisions. For example, as illustrated in FIG. 7, the controller 401 displays a reference image for the user to pick up an image of the predetermined positions of the vehicle 2 so that the same composition as the reference image is obtained. Without being limited to the above, a configuration is also possible in which messages instructing the user to pick up an image of a predetermined position, such as "Pick up an image of the floor mat of the front seat", "Pick up an image of the inside of the trash box" and "Pick up an image of the inside of the trunk" are sequentially read out and displayed, and the camera is activated to prompt the user to perform image pickup. When the manners provision of "replenishing energy for traveling up to a remaining amount at time of starting use" is set, the controller 401 may display a message requesting image pickup of display of a meter indicating a remaining amount of fuel (a fuel gauge) or a meter indicating a remaining amount of power for traveling (an electricity meter) to prompt the user to perform image pickup. Furthermore, markers indicating numbers or the like may be attached to predetermined positions for checking presence/absence and the like, such as an internal wall of a trash box, a sitting surface of a seat and a drink holder. A configuration is also possible in which messages instructing the user to pick up images of the markers attached to the predetermined positions, such as "Pick up an image of a marker No. 1" and "Pick up images of markers No. 2 and No. 3", are sequentially read out and displayed, and the camera is activated to prompt the user to perform image pickup.

When the user presses an image pickup button to perform image pickup at step S210, the controller 401 transitions to step S220 and transmits the picked-up image to the management server 3.

At step S230, the controller 401 judges whether image pickup of all the specified image pickup positions has been completed or not. In the case of a positive judgment, the controller 401 ends the process of FIG. 11. Further, in the case of a negative judgment at step S230, the controller 401 returns to step S210 and repeats image pickup of positions that have not been image-picked up yet. Note that, in the case of picking up an image of the inside of the vehicle 2 like FIG. 10, the process of FIG. 11 may be omitted. Further, a configuration is also possible in which the user terminal 4 picks up images of positions that the onboard apparatus 20 does not pick up images of, such as a configuration in which the onboard apparatus 20 picks up an image of the inside of the vehicle 2, and the controller 401 picks up an image of the outside of the vehicle 2. Note that, when the user returns the vehicle 2, the user terminal 4 may also prompt the user to pick up images of predetermined positions, acquire picked-up images at return time and transmits the images to the management server 3 similarly to FIG. 11. In this case, an image displayed in the display field 61 in the user interface of FIG. 7 may be an image picked up at use start time instead of a reference image. Thereby, it is possible to cause an image at return time to be picked up such that the same composition as the image picked up at use start time is obtained.

FIG. 12 is a diagram illustrating a process that the controller 301 of the management server 3 executes at time of a vehicle 2 being returned. When receiving information such as a picked-up image received at the time of the vehicle 2 being returned, from the onboard apparatus 20 or a user terminal 4, the controller 301 starts the process of FIG. 12. This information received at the time of return is, for example, the traveling situation sent from the onboard apparatus 20 at step S160 of FIG. 10 and the picked-up image sent from the user terminal 4 at S220 of FIG. 11.

At step S310, the controller 301 reads out a picked-up image at use start time corresponding to the received picked-up image at return time, from the storage unit 302. Note that the picked-up image at use start time is not limited to an image picked up when the user starts use, but a picked-up image received from an onboard apparatus 20 or a user terminal 4 when the last user returned the vehicle 2 (the last picked-up image at return time) may be used. Further, a configuration is also possible in which an image of predetermined positions inside the vehicle 2 is picked up in a state in which the inside of the vehicle 2 is cleaned in advance or a state in which there is no trash inside the vehicle 2 and stored in the storage unit 302 as a reference image, and, at step S310, the reference image is read out from the storage unit 302 instead of a picked-up image at use start time.

At step S320, the controller 301 compares the picked-up images at return time and use start time of the vehicle 2, and, when there is a different area, extracts an image of the area from the picked-up image at return time. Then, the controller 301 performs image processing for the image of this area and judges whether or not the image of this area indicates stain or trash. For example, an outline of an object indicated in this image is extracted. When there is a shadow of the object near the outline, the object is three-dimensional, and, therefore, the controller 301 judges that the object is trash. On the other hand, when there is not a shadow of the object near the outline, or when there is a small shadow, the object is planar, and, therefore, the controller 301 judges that the object is stain. Note that comparison between the images is not limited to the controller 301 making a judgment, but it is also possible to cause a person responsible for the management server 3 to make a judgment. For example, the controller 301 may display the picked-up image at return time and the picked-up image at use start time on the display unit 303, cause the responsible person to make a comparison, and cause him or her to input a result of the comparison such as "stained", "not stained", "some trash", "no trash" or the like.

At step S330, the controller 301 evaluates whether the user has obeyed manners provisions or not according to a result of the judgment of step S320 and the traveling situation received from the onboard apparatus 20. For example, when detecting stain at S320, the controller 301 judges that the manners provision (performing cleaning inside the vehicle) is not obeyed. Further when detecting trash at step S320, the controller 301 judges that the manners provision (cleaning up trash) is not obeyed. Furthermore, the controller 301 compares a remaining amount of energy for traveling at use start time with a remaining amount of energy for traveling at return time. Then, when the remaining amount of energy for traveling at return time does not exceed the remaining amount of energy for traveling at use start time, the controller 301 judges that the manners provision ("replenishing an amount of energy for traveling up to an amount at use start time") is not obeyed.

Further, when the number of operations of an antilock brake apparatus or the number of operations of a collision damage reduction brake apparatus exceeds a predetermined threshold, the controller 301 judges that the manners provision (not performing dangerous driving) is not obeyed. Further, when the highest speed during a use period exceeds a predetermined threshold, the controller 301 judges that the manners provision (not performing dangerous driving) is not obeyed.

The controller 301 calculates an evaluation value based on results of these judgments by the controller 301 and manners judgment information acquired from the onboard apparatus 20. For example, the controller 301 adds up the number of manners provisions that the user has obeyed and sets the number as the evaluation value. The controller 301 may multiply manners provisions that the user has obeyed by a weighting factor and add up results of the multiplications to set a result as the evaluation value.

At step S340, the controller 301 stores the evaluation value determined at step S330 into the storage unit 302 in association with a user ID. This evaluation value is used, for example, for judgment of whether use of the vehicle 2 is allowed or not when the use of the vehicle 2 is requested.

At step S350, the controller 301 decides incentive information according to the evaluation value determined at step S330 and transmits the incentive information to the user terminal 4. For example, an incentive in a case where the evaluation value is the maximum value (a value when all the manners provisions have been obeyed) is set, and the controller 301 decreases an incentive to be provided, according to a difference from the evaluation value determined at step S330. In other words, the number of points to be provided, an amount of electronic money or an amount of content (music, still images or video) is decreased according to the difference. Note that, when a passenger rides together, incentive information is also transmitted to the passenger. Furthermore, incentive information may be provided for the owner of the vehicle 2. In this case, an amount corresponding to an amount of decrease in the incentive provided for the user according to the evaluation value may be provided for the owner. For example, an incentive that is not provided for the user because of not obeying the manners provision of "cleaning up trash" is provided for the owner who has to clean up the trash. Note that the incentive information may be an incentive itself that is provided for the user, such as electronic money, music or video, or may be information notifying that an incentive has been provided, such as notification of the number of points given by another point system.

Effects of Embodiment

As described above, in the information processing system (the company car sharing system) of the present embodiment, an evaluation value for obedience of a plurality of manners provisions is calculated based on a picked-up image at return time of a vehicle 2.

Thereby, the information processing system of the present embodiment can evaluate whether a user has obeyed the manners provisions or not and prompt the user to use the vehicle 2 while obeying manners, by making it possible to make a response corresponding to the evaluation, for example, providing an incentive when the evaluation is good.

The management server 3 provides incentive information indicating an incentive, such as discount on a fee for using the vehicle 2, points in a predetermined point system or electronic money, according to an evaluation value. Thus, the management server 3 can induce the user to obey manners by giving the user an incentive for obeying the manners.

In a case where the evaluation value when the user uses the vehicle 2 is equal to or below a threshold, the management server 3 may generate penalty information indicating a penalty, such as prohibiting use by the user from next time, and present the penalty information to the user. Thereby, it is possible for the management server 3 to smoothly operate car sharing by suppressing use by a user who does not obey manners provisions, such as giving a penalty to the user to exclude the user.

In a case where the evaluation value when the user used the vehicle 2 in the past is equal to or below a threshold, the management server 3 selects, when use of a vehicle 2 is requested by the user next time, a watcher (a passenger) to ride in the vehicle 2 together and notifies the watcher to ride in the vehicle 2 together. Thereby, when a user with a low evaluation value uses a vehicle 2, the management server 3 can cause manners provisions to be obeyed by causing a watcher to ride together. Further, by causing the user with a low evaluation value to approve image pickup of the inside of a vehicle 2 during rent, the management server 3 can encourage the user to psychologically obey manners.

MODIFICATION

Though the embodiment described above indicates an example in which the information processing system 1 includes the onboard apparatuses 20, the information processing system 1 may be configured not to include the onboard apparatuses 20. For example, the information processing system 1 may be configured, including the management server 3 and the user terminals 4. Further, the information processing system 1 may be configured, including the management server 3, the user terminals 4 and the passenger terminal 5. In this case, the process for acquiring a picked-up image at use start time and a picked-up image at return time and the process for transmitting a picked-up image to the management server 3 are performed by each user terminal 4 as illustrated in FIG. 11. Whether a watcher is riding together or not may be confirmed by the management server 3 transmitting a mail to a passenger terminal 5 and a watcher (a passenger) replying to the mail when the watcher is riding together during a use period.

In the control method described in the above embodiment, a processor of a computer reads out and executes a computer program. Such a computer program may be provided to the computer by a non-transitory computer-readable storage medium connectable to a system bus of the computer or may be provided to the computer via a network. The non-transitory computer-readable storage medium is, for example, a disk of an arbitrary type such as a magnetic disk (a floppy (R) disk, a hard disk drive (HDD) and the like) and an optical disk (a CD-ROM, a DVD disk, a Blu-ray disk and the like). As the non-transitory computer-readable storage medium, a read-only memory (ROM), a random access memory (RAM), an EPROM, an EEPROM, a magnetic card, a flash memory, an optical card, and a medium of an arbitrary type that is appropriate for storing electronic commands are included.

What is claimed is:

1. An information processing apparatus, comprising at least one processor configured to execute operations of:
    acquiring, from a data storage, manners information indicating a plurality of manners provisions for use of a vehicle;
    transmitting the manners information to a user terminal owned by a user who is lent the vehicle;
    receiving, from the user terminal, a starting picked-up image of the vehicle about the plurality of manners provisions at a starting time of use of the vehicle;
    receiving, from the user terminal, a returning picked-up image of the vehicle about the plurality of manners provisions at time of returning the vehicle;
    calculating a user evaluation value for obedience of the plurality of manners provisions, based on a comparison of the starting picked-up image and the returning picked-up image;
    determining a necessity for a watcher to watch the user in a next rental of a vehicle by the user, in a case where the user evaluation value is equal to or below a threshold;
    selecting the watcher;
    generating watcher information indicating that the user is requested to approve the watcher as a passenger;
    transmitting the watcher information to each of the user terminal and a watcher terminal owned by the watcher;
    recording the user evaluation value calculated for the user at the time of returning the vehicle during the next rental as a watcher evaluation value of the watcher;
    generating watcher incentive information for the watcher in response to the watcher evaluation value; and
    transmitting the watcher incentive information to the watcher terminal.

2. The information processing apparatus according to claim 1, wherein the at least one processor is further configured to execute operations of:
generating user incentive information for the user corresponding to the user evaluation value; and
providing the user incentive information to the user.

3. The information processing apparatus according to claim 2, wherein
the user incentive information and the watcher incentive information each indicate at least one of discount on a fee for using the vehicle, priority at a time of using the vehicle, a coupon for receiving a predetermined service, points in a predetermined point system, a lot, electronic money, music, a still image, and a moving image.

4. The information processing apparatus according to claim 1, wherein
the plurality of manners provisions include at least one of performing cleaning inside the vehicle, cleaning up trash, replenishing energy for traveling up to a remaining amount at the starting time of use, and not leaving anything.

5. The information processing apparatus according to claim 1, wherein
when the user evaluation value at a time of the user having used the vehicle is equal to or below a threshold, the at least one processor generates information indicating a penalty for the user, the information being provided for the user.

6. The information processing apparatus according to claim 1, wherein
the at least one processor is further configured to execute an operation of acquiring information indicating a traveling situation of the vehicle during driving of the vehicle by the user; and
the user evaluation value for obedience of the plurality of manners provisions is calculated based on the returning picked-up image and the information indicating the traveling situation.

7. An information processing method, the method comprising:
acquiring, from a data storage, manners information indicating a plurality of manners provisions for use of a vehicle;
transmitting the manners information to a user terminal owned by a user who is lent the vehicle;
receiving, from the user terminal, a starting picked-up image of the vehicle about the plurality of manners provisions at a starting time of use of the vehicle;
receiving, from the user terminal, a returning picked-up image of the vehicle about the plurality of manners provisions at time of returning the vehicle;
calculating a user evaluation value for obedience of the plurality of manners provisions, based on a comparison of the starting picked-up image and the returning picked-up image;
determining a necessity for a watcher to watch the user in a next rental of a vehicle by the user, in a case where the user evaluation value is equal to or below a threshold;
selecting the watcher;
generating watcher information indicating that the user is requested to approve the watcher as a passenger;
transmitting the watcher information to each of the user terminal and a watcher terminal owned by the watcher;
recording the user evaluation value calculated for the user at the time of returning the vehicle during the next rental as a watcher evaluation value of the watcher;
generating watcher incentive information for the watcher in response to the watcher evaluation value; and
transmitting the watcher incentive information to the watcher terminal.

8. The information processing method according to claim 7, further comprising:
generating user incentive information for the user corresponding to the user evaluation value; and
providing the user incentive information to the user.

9. The information processing method according to claim 8, wherein
the user incentive information and the watcher incentive information each indicate at least one of discount on a fee for using the vehicle, priority at a time of using the vehicle, a coupon for receiving a predetermined service, points in a predetermined point system, a lot, electronic money, music, a still image, and a moving image.

10. The information processing method according to claim 7, wherein
the plurality of manners provisions include at least one of performing cleaning inside the vehicle, cleaning up trash, replenishing energy for traveling up to a remaining amount at the starting time of use, and not leaving anything.

11. The information processing method according to claim 7, further comprising:
when the user evaluation value at a time of the user having used the vehicle is equal to or below a threshold, generating information indicating a penalty for the user, the information being provided for the user.

12. The information processing method according to claim 7, further comprising acquiring information indicating a traveling situation of the vehicle during driving of the vehicle by the user;
wherein the user evaluation value for obedience of the plurality of manners provisions is calculated based on the returning picked-up image and the information indicating the traveling situation.

13. A non-transitory storage medium storing a program for causing a computer of a user who is lent a vehicle to execute operations of:
receiving manners information indicating a plurality of manners provisions about use of the vehicle;
acquiring a starting picked-up image of the vehicle about the plurality of manners provisions at a starting time of use of the vehicle;
transmitting the starting picked-up image to an information processing apparatus that executes processing relating to the starting picked-up image;
acquiring a returning picked-up image of the vehicle about the plurality of manners provisions at time of returning the vehicle;
transmitting the returning picked-up image to a the information processing apparatus;
receiving user incentive information for the user from the information processing apparatus, the user incentive information being generated based on a user evaluation value for obedience of the plurality of manners provisions calculated based on a comparison of the starting picked-up image and the returning picked-up image; and
receiving, from the information processing apparatus, watcher information indicating that the user is requested to approve a watcher as a passenger, the watcher being selected in response to a determination of a necessity of the watcher is necessary in a next rental of a vehicle by the user, in a case where the user evaluation value is equal to or below a threshold, wherein a computer of the watcher receives, from the information processing apparatus, the watcher information, and watcher incentive information for the watcher generated in response to an watcher evaluation value of the watcher, the watcher evaluation value being the user evaluation value calculated for the user at the time of returning the vehicle during the next rental.

14. The non-transitory storage medium storing the program according to claim 13, wherein the user incentive information and the watcher incentive information each indicate at least one of discount on a fee for using the vehicle, priority at a time of using the vehicle, a coupon for receiving a predetermined service, points in a predetermined point system, a lot, electronic money, music, a still image, and a moving image.

15. The non-transitory storage medium storing the program according to claim 13, wherein when the user evaluation value at a time of the user having used the vehicle is equal to or below a threshold, the program further causes the computer of the user to execute an operation of receiving information indicating a penalty for the user from the information processing apparatus.

16. The non-transitory storage medium storing the program according to claim 13, wherein as the returning picked-up image of the vehicle, the program further causes the computer of the user to execute operation of acquiring a picked-up image indicating at least one of having performed cleaning inside the vehicle, having cleaned up trash, having replenished energy for traveling up to a remaining amount at the starting time of use, not having scratched exterior parts, not having made interior parts dirty and not leaving anything.

* * * * *